United States Patent [19]
Sprague

[11] Patent Number: 6,018,348
[45] Date of Patent: Jan. 25, 2000

[54] METHOD FOR VISIBILITY CULLING

[75] Inventor: David L. Sprague, Gilbert, Ariz.

[73] Assignee: Intel Corporation, Santa Clara, Calif.

[21] Appl. No.: 09/001,311

[22] Filed: Dec. 31, 1997

[51] Int. Cl.[7] .................................................. G06F 15/00
[52] U.S. Cl. ............................................................ 345/421
[58] Field of Search ..................................... 345/420, 421, 345/422, 113, 114, 118

[56] References Cited

U.S. PATENT DOCUMENTS

| | | | |
|---|---|---|---|
| 4,694,404 | 9/1987 | Meagher | 345/421 |
| 5,602,564 | 2/1997 | Iwamura et al. | 345/119 |

*Primary Examiner*—Phu K. Nguyen
*Attorney, Agent, or Firm*—Blakely, Sokoloff, Taylor & Zafman LLP

[57] ABSTRACT

A method is disclosed for determining whether a distant 3-dimensional object is completely obstructed from view by a closer 3-dimensional object. The method includes determining which of the two 3-dimensional objects is farther from a viewer. For the object farther away, determining that object's smallest bounding sphere, and projecting that sphere onto the view plane of the observer. For the object closer to the observer, determining that object's largest bounded sphere, and projecting that sphere onto the view plane. The two projections are then compared. If the near-object projection completely contains the far-object projection, then the distant object is completely obscured from view by the closer object. If completely obscured from view, the distant object is discarded; otherwise, the distant object is rendered in the normal manner.

15 Claims, 10 Drawing Sheets

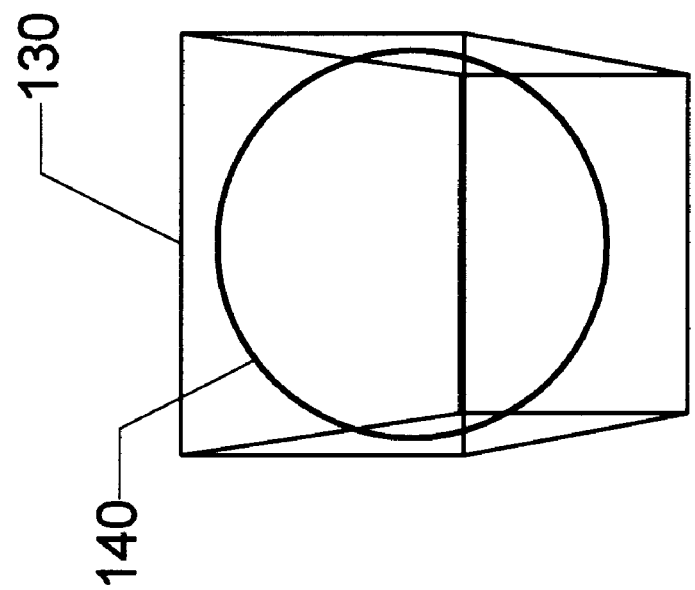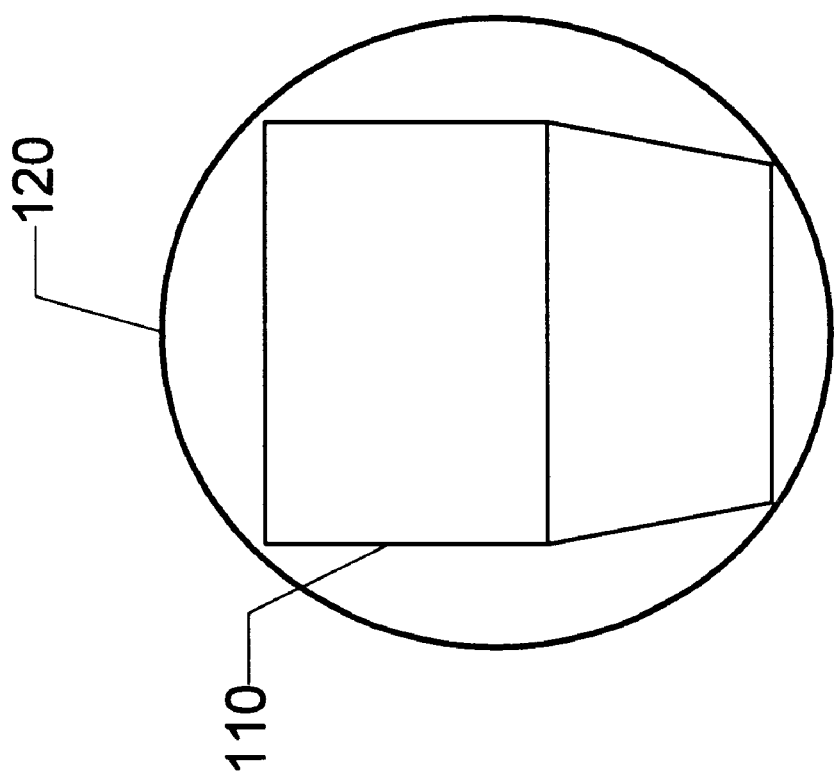
Fig. 3

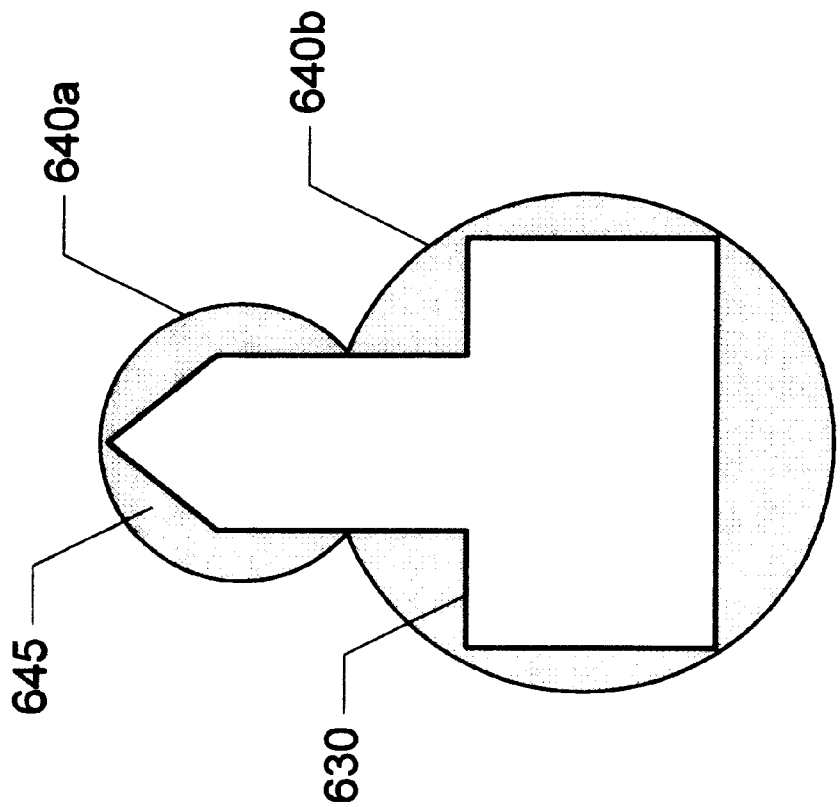
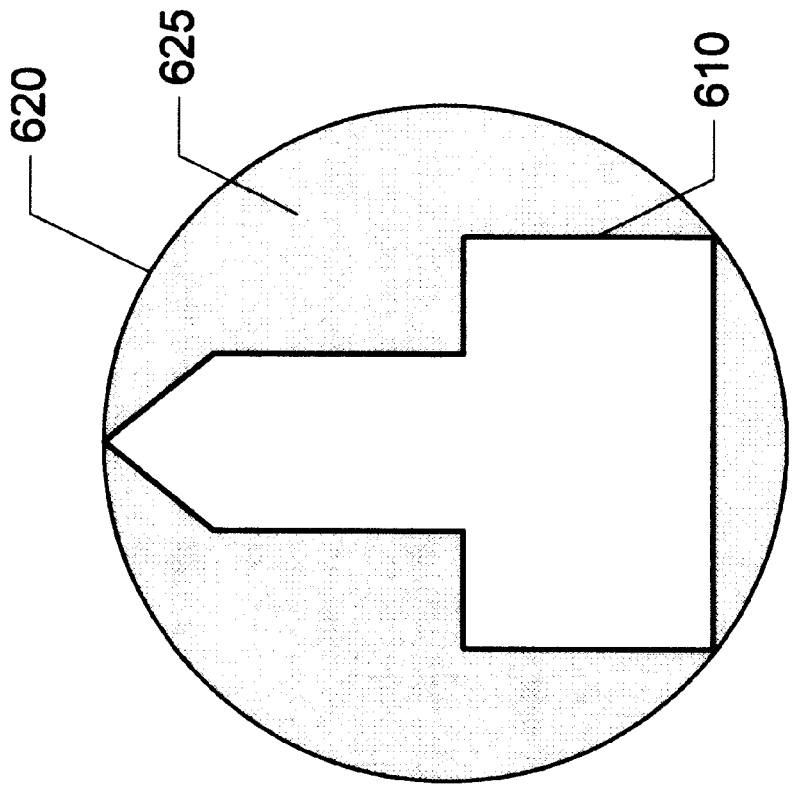
Fig. 9

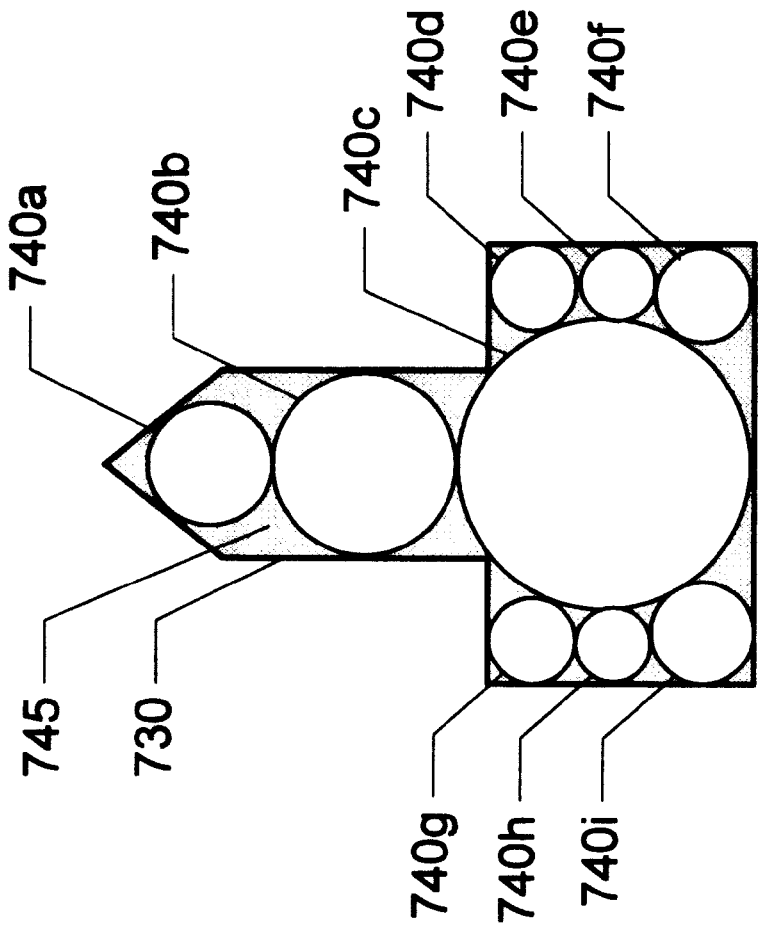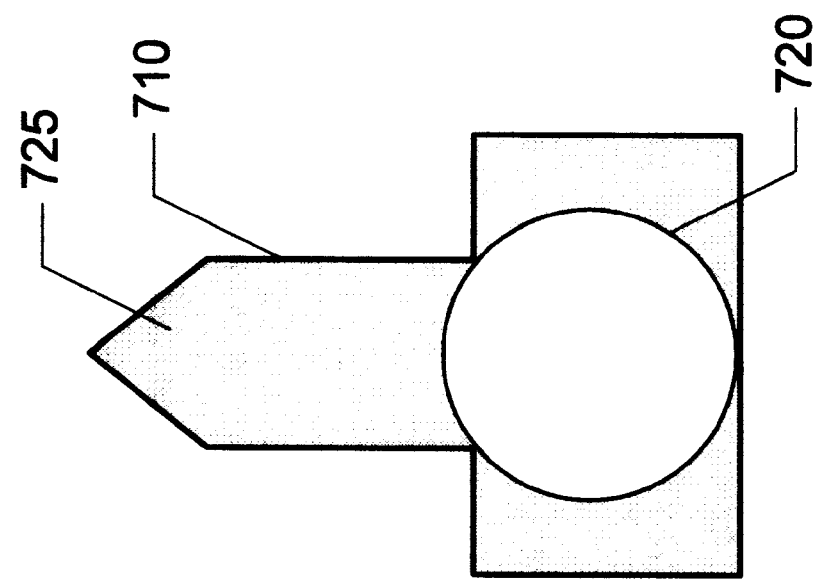
Fig. 10

METHOD FOR VISIBILITY CULLING

BACKGROUND OF THE INVENTION

1. Field of the Invention

This invention relates generally to computer graphics. More particularly, the present invention relates to a method for determining whether a distant object is completely obstructed by a closer object, for use in real-time 3-dimensional graphics.

2. Description of the Related Art

By about 1950, computer scientists working in graphics could produce, on a computer screen, a moving blip that simulated a bouncing ball. But with the increases in computer memory and speed achieved since then, graphics programmers have raised their visualizing standards vastly higher. Today they seek realism, not just for static images but for animated ones as well. Such realism, however, is difficult to achieve in real-time 3-dimensional graphics because of the numerous computations needed, in a short period of time, to make an animated 3-dimensional object move realistically in real-time.

Computer graphics may be considered as having two fundamentals: modeling, and rendering. In modeling, an artist or a designer essentially builds a mathematical model of an object, by introducing all the structural information, such as which points are to be joined by lines or curves, or where a sphere attaches to a cube, or how an image can be approximated by triangles. Abstract information, for example, how a scene might change in response to different lighting, must also be provided for. In rendering, the computer is made to display the model's final colors, textures, highlights, shadows, and so forth, on the screen, at the new position of the object.

When an object is static or stationary, for example, if the view point is constrained to follow a specific path and most objects do not move, the necessary calculations can be made, and the resulting data stored, long before the computer video game is played. When the game is actually played, previously stored information is used to generate the static image. The amount of time needed to make the calculations does not matter, because the calculations do not need to be made while the game is being played.

In the case of a computer video game where the view point is less constrained or there are a large number of moving objects, new position information must be determined as the game is played. For example, in a sophisticated flight simulator program, the position of an aircraft, or of an object approached by an aircraft, might need to be changed in real-time.

In a sophisticated computer video game, the field-of-view, that is, the 3-dimensional area of play as seen by the player, might include numerous 3-dimensional objects. For example, in a flight simulator program, the field-of-view might include numerous buildings and trees, aircraft, boats and other vessels, missiles, and debris. A particular object, for example an airplane, might be within the player's field-of-view at one time, but not at another, because it becomes obstructed by one of the buildings, either because the airplane being observed has moved or because the player has moved, or both. In known prior art computer graphics, the numerous calculations to determine the object's new position, shape, and appearance are made, and based on those results, the object is drawn pixel by pixel into a display memory. In some cases, a test might be made on each pixel to determine whether it is obscured by a pixel generated from a closer object. In other cases, the memory is overwritten by pixel information for closer objects. Numerous calculations are made even when the object is totally obstructed from view by a closer object, thereby wasting valuable real-time computation time, because not until the calculations are made to render the object does it become known that the object is obstructed from view.

The present invention provides a quick, efficient method for determining whether a distant object is completely obstructed from view by a closer object. If it is totally obstructed from view, then the distant object can be discarded and no further calculations need to be made to render that object, thereby saving valuable real-time computation time; if, on the other hand, it can not be determined whether the distant object is completely obstructed from view by the closer object, then calculations can proceed in the normal manner to render that object. Thus the present invention is directed to overcoming, or at least reducing, the effects of one or more of the problems mentioned above.

SUMMARY OF THE INVENTION

In one aspect of the present invention, a method is provided for determining whether a distant 3-dimensional object is completely obstructed from view by a closer 3-dimensional object. For the object farther from the location of the observer, the smallest bounding sphere is determined; that is, the smallest sphere that fits around the outside of the object, so that the object is wholly contained within the sphere. For the object closer to the viewer, the largest bounded sphere is determined; that is, the largest sphere that fits inside of, and is wholly contained by, the closer object.

The smallest bounding sphere of the farther object is projected onto the view plane at which the observer is viewing the scene; and, the largest bounded sphere of the closer object is projected onto the view plane. Because the projection of a sphere onto a plane results in the projected image being a circle, the view plane contains two circles: one circle made by the bounding sphere of the farther object, and one circle made by the bounded sphere of the closer object. If the circle for the closer object completely contains the circle for the distant object, then the closer object completely obstructs the distant object from the view of the observer, and, consequently, the distant object is discarded and need not be rendered.

Thus, for each object, a determination is made whether or not there is an object in front of it, from the point-of-view of an observer, whose projected bounded sphere completely contains the projected bounding sphere of a more distant object.

The test is a conservative one, which can be done very rapidly. It lends itself to rapid real-time culling, discarding distant objects certain to be not visible at the observer's view plane, so that only those objects that really might be visible need be rendered. These and other benefits will become evident as the present invention is described more fully below.

BRIEF DESCRIPTION OF THE DRAWINGS

Other objects and advantages of the invention will become apparent upon reading the following detailed description and upon reference to the drawings in which:

FIG. 3 is a geometric description according to one aspect of the present invention;

FIGS. 9 and 10 are geometric descriptions according to aspects of the present invention.

Figure 1:
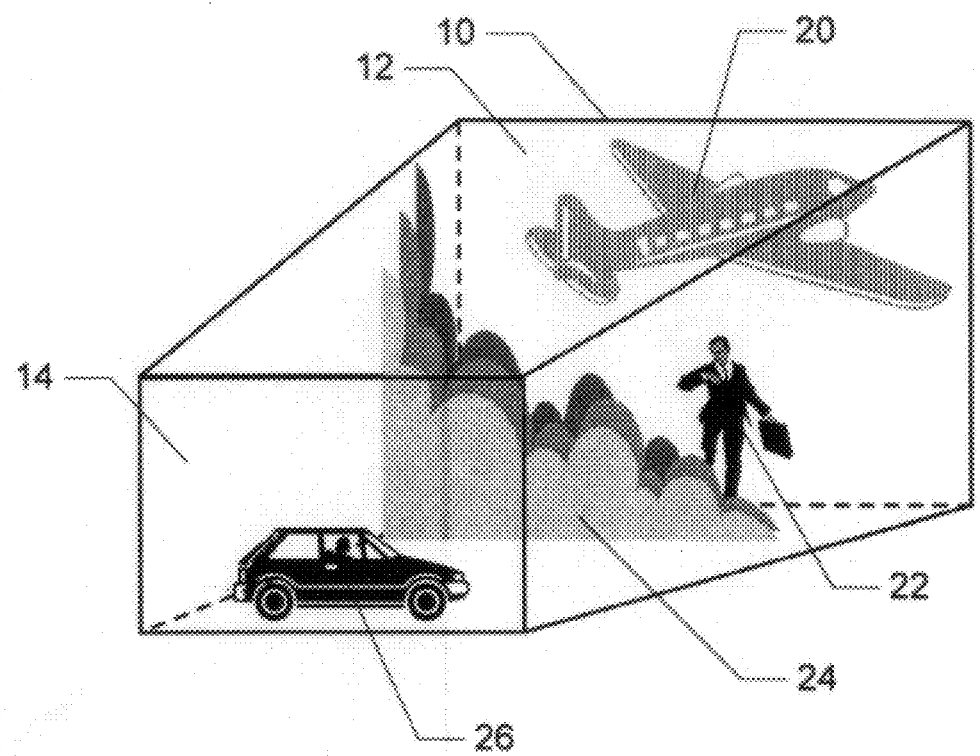
FIG. 1 is a perspective view of a 3-dimensional scene, according to one aspect of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to the drawings, and in particular to FIG. 1, illustrated is a view frustum 10 containing various 3-dimensional objects, including an airplane 20, a man 22, numerous plants 24, and a car 26. The view frustum 10 represents the 3-dimensional field-of-view of an observer, and is essentially a portion of a 4-sided pyramid having a rectangular base 12, a plane 14 parallel to the base 12, and a vertex (not shown) that corresponds in location to a point sometimes called the center-of-projection for the field-of-view of the observer.

In the view frustum 10, the plane 14 is the view plane of the observer, that is, plane 14 contains all that the observer sees when the observer is watching the scene in the view frustum 10. The base 12 represents the most faraway part in the field-of-view at which objects are considered, a plane sometimes called the far-clipping plane; objects farther from the view plane 14 than the base 12 are not rendered.

Figure 2A:
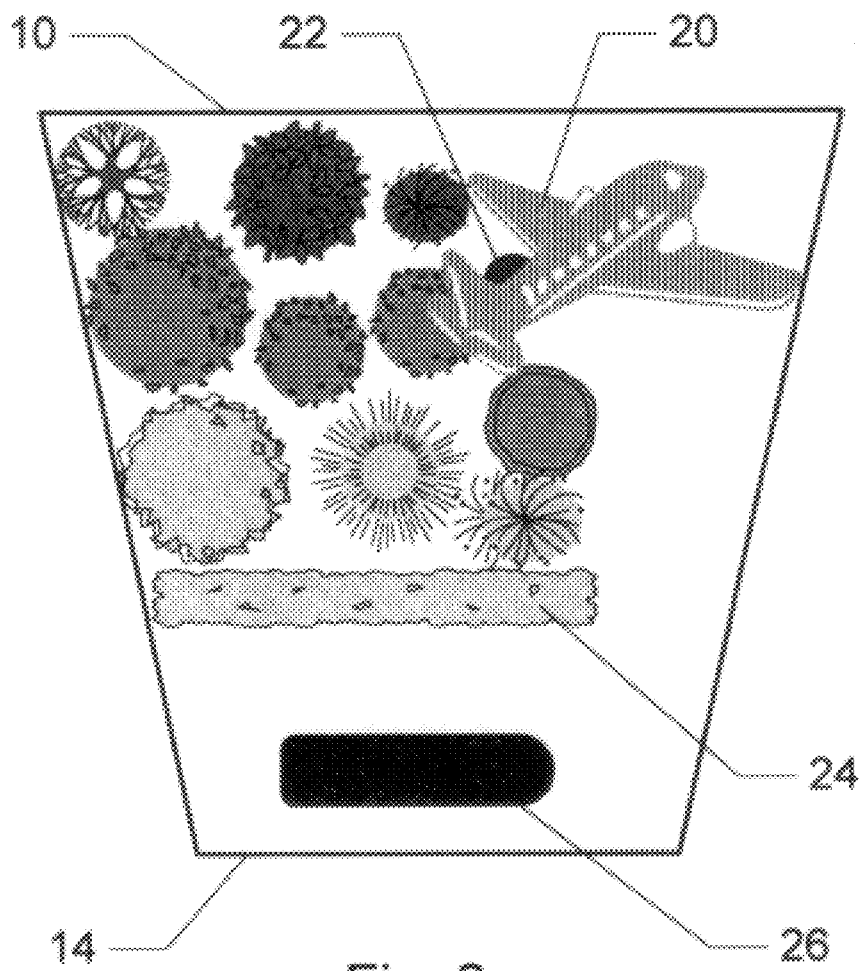
FIGS. 2a and 2b are elevated and frontal views, respectively, of the 3-dimensional scene depicted in FIG. 1.
Figure 2B:
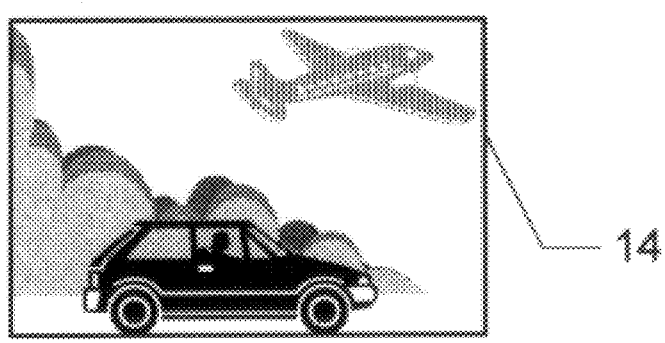

FIG. 1 illustrates the view frustum 10 in a 3-dimensional manner. FIG. 2a shows the scene in the view frustum 10 from a bird's eye view, looking down from above. FIG. 2b shows the view at the view plane 14, from the point-of-view of an observer, positioned at the plane 14, and viewing the 3-dimensional scene occurring in the view frustum 10.

As illustrated in FIGS. 1 and 2, the man 22 is now in a particular location where he is totally obstructed from the observer's view, in the view plane 14 illustrated in FIG. 2b, by the plants 24. That is, from the point-of-view of the observer, the distant man 22 is completely obstructed from view by the closer plants 24. Since the man 22 is completely obstructed from view, there is no need to further process information about the man, to render the image of the man.

Assuming for the moment that the two objects of interest are the distant man 22 and the closer plants 24, according to the present invention: the smallest bounding sphere that bounds the man 22 is determined; the largest bounded sphere that is contained in the plants 24 is determined; and both spheres are projected onto the view plane 14. Then the following determination is made: if the projection of the bounded sphere of the plants 24 completely contains the projection of the bounding sphere of the man 22, then the man is totally obstructed from view by the plants.

Since the man 22 and the plants 24 are each geometrically complex, the present invention can more readily be understood with reference to simpler geometric shapes, although the principle is the same. Referring to FIG. 3, a 3-dimensional box 110 is illustrated. The box 110 is completely enclosed by a sphere 120. That is, the box 110 is wholly contained within the sphere 120. The sphere 120 is a bounding sphere of the box 110, because the box is completed bounded by, and wholly enclosed in, the sphere 120. If the sphere 120 is made as small as possible, so that the inter surface of the sphere just about touches the box 110, then the sphere is the smallest bounding sphere of the box 110. In the method of the present invention, the smallest bounding sphere is the sphere considered for the distant object.

With continued reference to FIG. 3, illustrated is a 3-dimensional box 130. The box 130 is shown in wire-frame style, so that the inside of the box may be seen. Illustrated also is a sphere 140. The sphere 140 is wholly contained within the box 130. If the sphere 140 is made a big as possible, so that the outer surface of the sphere just touches the inner surface of the box 130, but is still wholly contained within the box 130, then the sphere is the largest bounded sphere of the box 130. According to the method of the present invention, the largest bounded sphere is the sphere considered for the closer object.

According to one embodiment of the present invention, the smallest bounding sphere is determined for the distant object, and the largest bounded sphere is determined for the closer object. Once these spheres are determined, the method proceeds using these spheres, and not the objects themselves.

Figure 4:
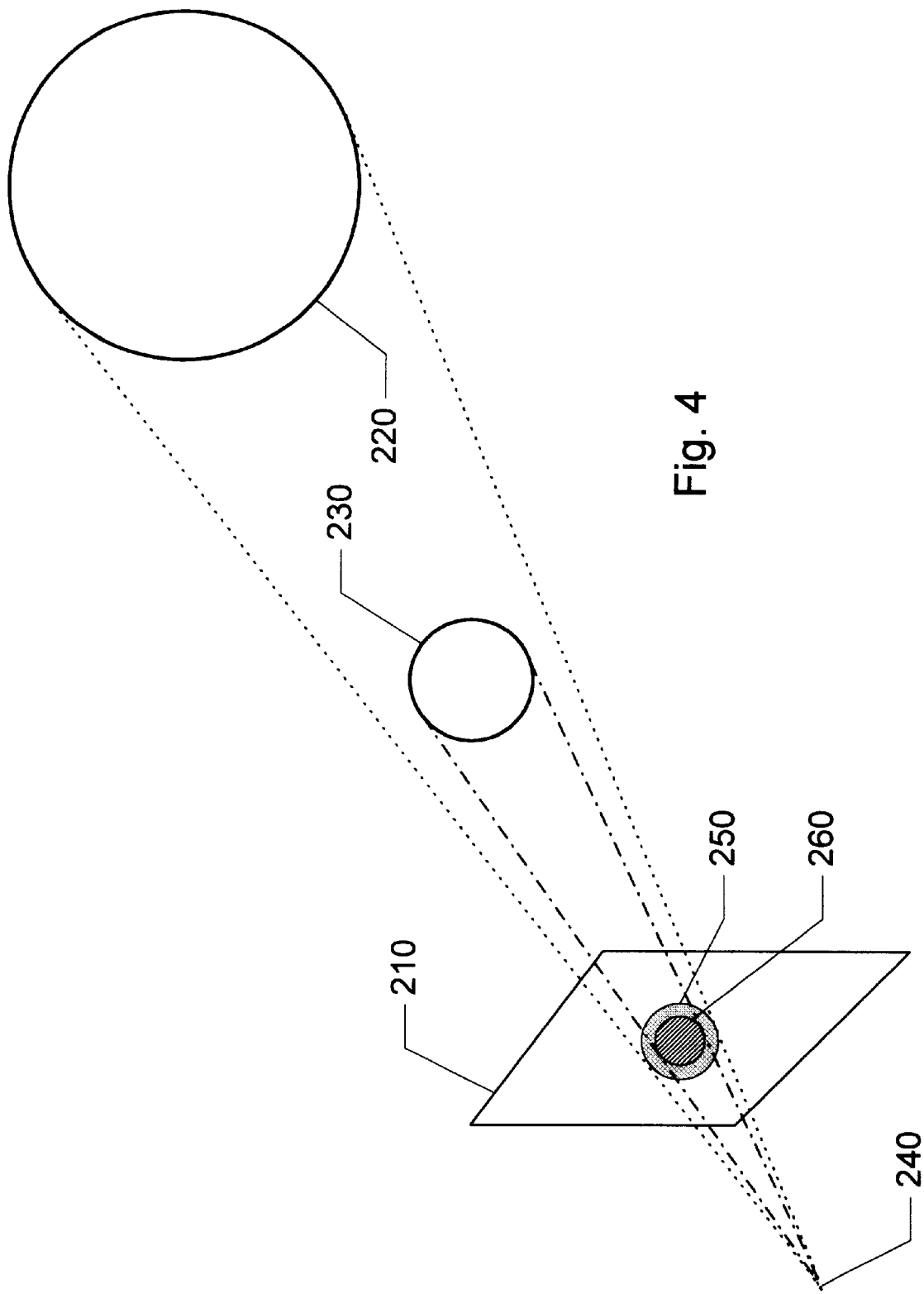
FIGS. 4, 5, 6, and 7 are 3-dimensional perspective views according to certain aspects of the present invention.

Referring now to FIG. 4, illustrated in perspective form is a view plane 210 corresponding, for example, to the view plane 14 in FIG. 2b. The sphere 220 illustrated in FIG. 4 is the smallest bounding sphere for the object farther from the view plane 210, and the sphere 230 is the largest bounded sphere for the object closer to the view plane 210.

According to the method of the present invention, the bounding sphere 220 of the distant object is projected to a center-of-projection 240, and onto the view plane 210 located between the distant object and the center-of-projection. The projection formed on the view plane 210 is a circle 250, because a sphere, projected onto such a plane, always forms a circle.

With continued reference to FIG. 4, the largest bounded sphere 230 of the closer object is also projected onto the view plane 210, forming a circle 260.

These projections then result in two circles at the view plane 210: a far-object projection circle 250 resulting from projecting the object farther from the view plane; and a near-object projection circle 260 resulting from projecting the object closer to the view plane. The projection circles 250 and 260 now must be compared. As illustrated in FIG. 4, the near-object projection circle 260 does not completely contain the far object projection circle 250. Consequently, at the observer's view plane 210, it is not known whether the distant object is totally obstructed by the closer object.

Figure 5:
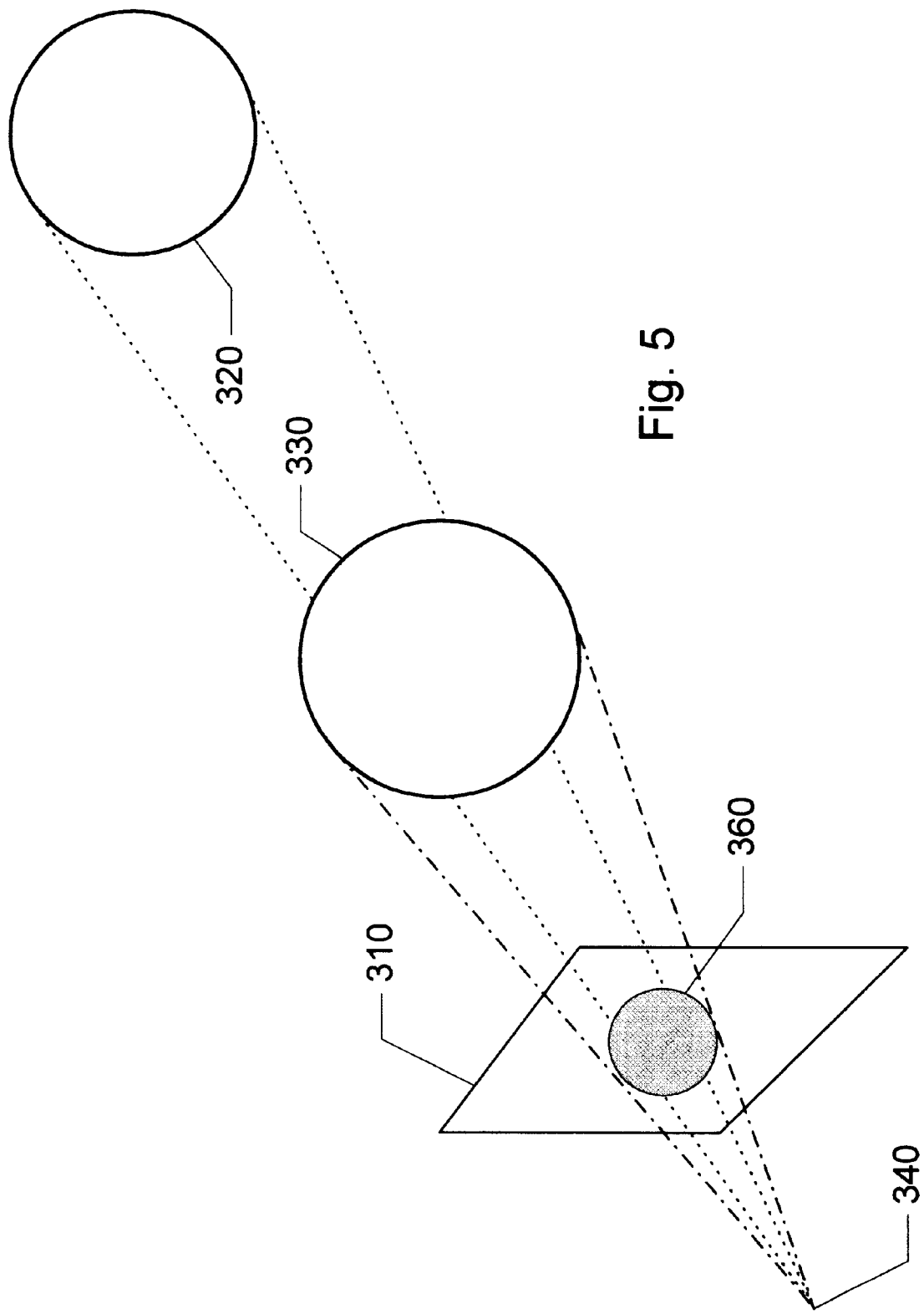

Referring now to FIG. 5, the smallest bounding sphere 320 of a distant object, and the largest bounded sphere 330 of a closer object, are each projected toward a center-of-projection 340, and onto a view plane 310. Projecting the bounded sphere of the closer object produces a near-object projection circle 360 on the view plane 310. Projecting the bounding sphere 320 of the distant object onto the view plane 310 results in a far-object projection circle 350 wholly contained within the near-object projection circle 360, and therefore not visible in FIG. 5. Because the far-object projection circle 350 is wholly contained within the near-object projection circle 360, the distant object is totally hidden from view at the view plane 310 by the closer object.

Figure 6:
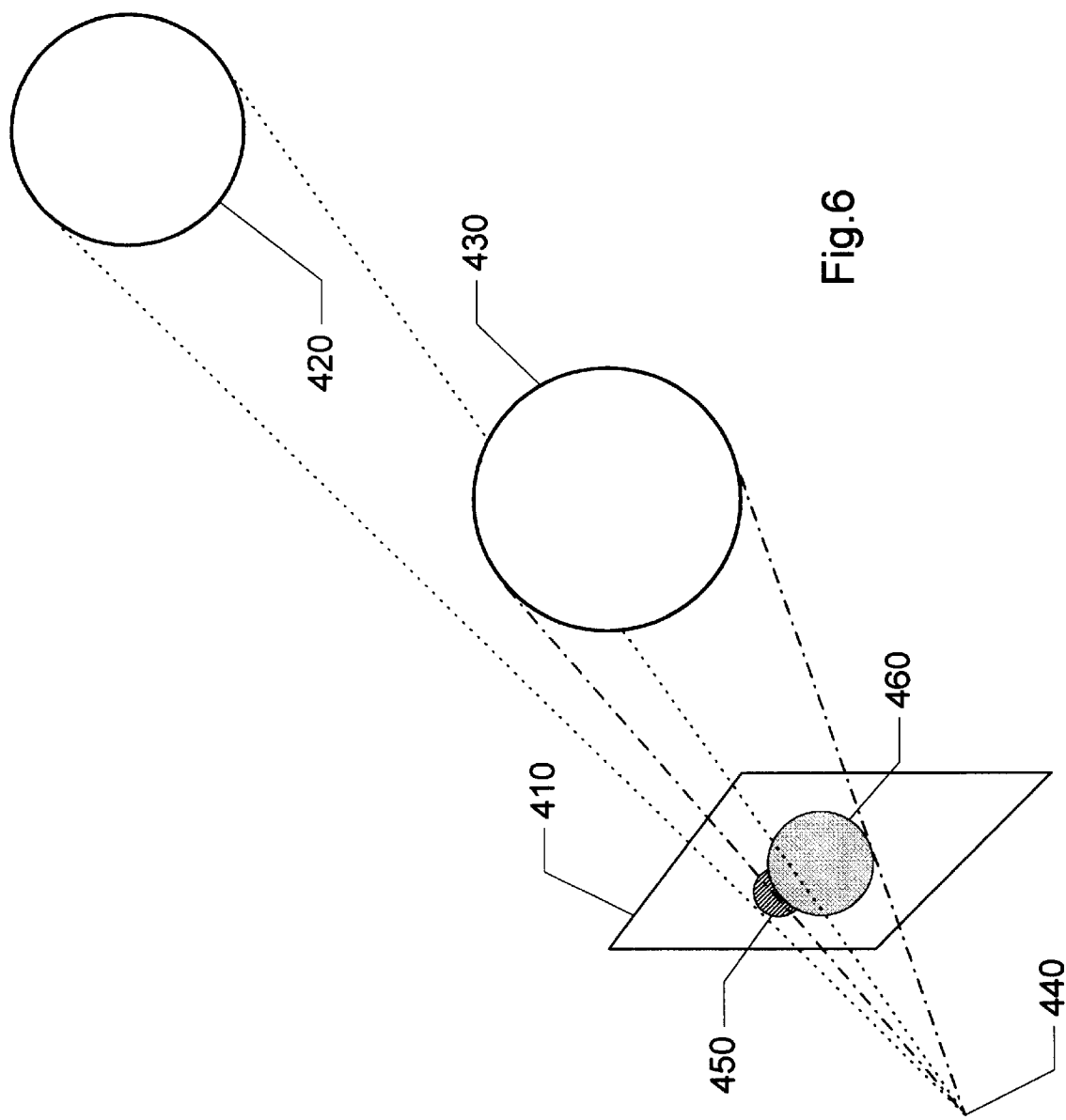

FIGS. 4 and 5 each illustrated the situation in which the bounding sphere of the distant object, and the bounded sphere of the closer object are in alignment with each other with respect to the center-of-projection. FIG. 6 illustrates the situation when the spheres are not aligned in this manner.

Referring now to FIG. 6, the smallest bounding sphere 420 of a distant object is projected toward a center-of-projection 440, and forms a far-object projection circle 450 on a view plane 410. The largest bounded sphere 430 of the closer object is projected toward the center-of-projection 440, and forms a near-object projection circle 460 on the view plane 410. As illustrated, part of the far-object projection circle 450 is contained in the near-object projection circle 460, and part of it is not. Because the far-object projection circle 450 is not completely contained within the near-object projection circle 460, the distant object is not completely obstructed from view by the closer object.

Figure 7:
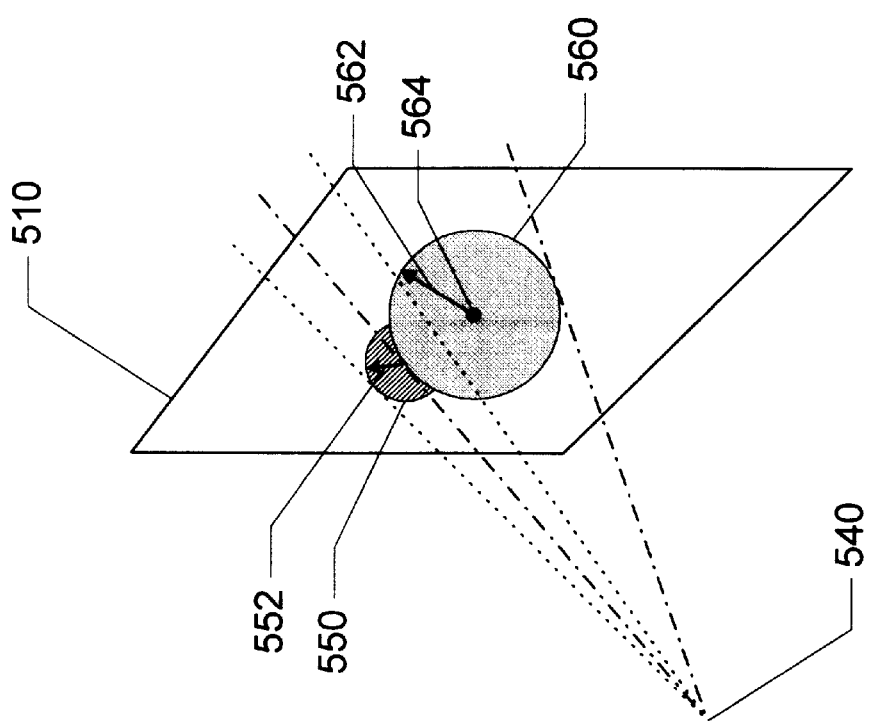

Referring now to FIG. 7, illustrated is a view similar to the view seen at the view plane 410 of FIG. 6. In FIG. 7, at a view plane 510, is a far-object projection circle 550, and a near-object projection circle 560. The far-object projection circle 550 has a radius 552, and a center 554 (not illustrated); the near-object projection circle 560 has a radius 562, and a center 564. This center information and radius information are the only pieces of information that need be considered, according to an aspect of one embodiment of the present invention, when comparing the two projection circles to determine whether the near-object projection circle completely contains the far-object projection circle. These pieces of information provided all that is needed to make the necessary calculations.

With continued reference to FIG. 7, the co-ordinates of the center 554 of the far-object projection circle is $x_1$, $y_1$, and its radius 552 is $r_1$, and the co-ordinates of the center 564 of the near-object projection circle is $x_2$, $y_2$, and its radius 562 is $r_2$. If d is the distance between centers 554 and 564, then the far-object projection circle is completely contained within the near-object projection circle when $d+r_2<r_1$. Since $d^2=(x_2-x_1)^2+(y_2-y_1)^2$, then the inequality to be solved is: $(x_2-x_1)^2+(y_2-y_1)^2<(r_1-r_2)^2$.

Figure 8:
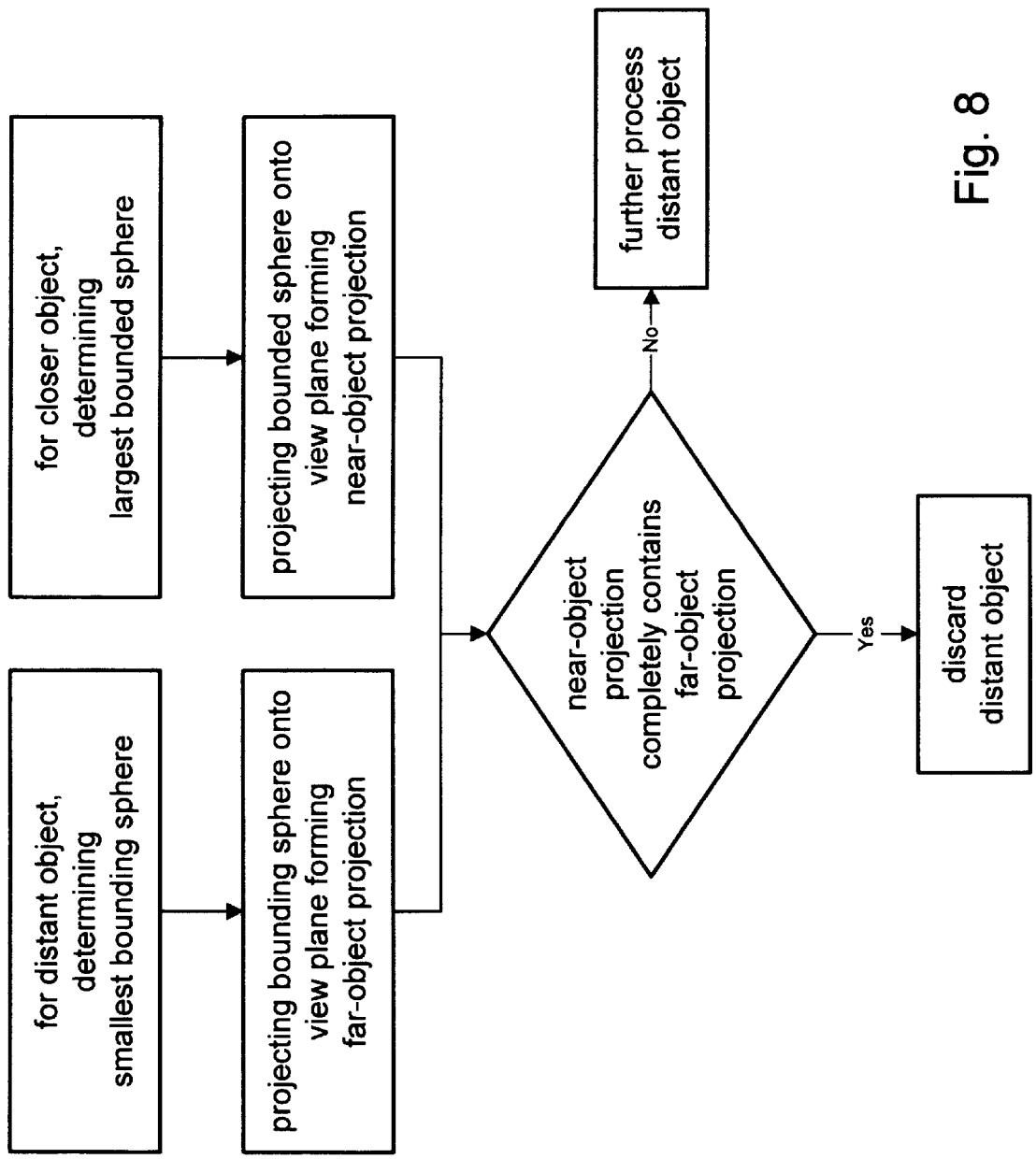
FIG. 8 is a flow chart of a culling method according to one embodiment of the present invention.

Referring now to FIG. 8, as described thus far according to one embodiment of the present invention, the smallest bounding sphere of the distant object, and the largest bounded sphere of the closer object, are each determined and projected onto the view plane, and the projection circles formed on the view plane compared. Approximating each object with a single sphere results in only two pieces of information for each projection circle, its center and its radius, that need to be considered in determining whether the near-object projection circle completely contains the far-object projection circle. The needed calculations can very rapidly be made.

The test is relatively conservative, and results in the distant object being discarded whenever its far-object projection circle is wholly contained within the near-object projection circle. In such a situation the distant object is completely obstructed from view by the closer object. But when the far-object projection circle is not completely contained within the near-object projection circle, the distant object might or might not be visible; further processing is necessary to render the objects in the normal manner to determine visibility. In this manner the present method is conservative: it discards the distant object when it is certain the object is not visible, and permits further processing when it is not certain the object is not visible, that is, when the object really might be visible. Thus the present invention provides a conservative test, using extremely simple calculations.

The process described thus far is used when the two objects are spaced one from the other; if the two objects overlap, for example, two trees having branches that are intertwined, the process is not used because the bounding and bounded spheres would each occupy, at least in part, the same physical space. A quick determination of whether the two objects are sufficiently spaced one from the other is to calculate and compare the minimum depth of the distant object with the maximum depth of the closer object, as described below.

Consider the view frustum 10 as being in a 3-dimensional x,y,z co-ordinate system, in which the z-direction is positive going from the z-plane of the view plane 14 toward the z-plane of the base plane 12. For the closer object having a bounded sphere at z-location $z_1$, and with a radius $r_1$, the maximum depth is $z_1+r_1$; for the distant object having a bounding sphere located at z-location $z_2$, and with a radius $r_2$, the minimum depth is $z_2-r_2$. Now compare the minimum depth of the distant object, $z_2-r_2$, with the maximum depth of the closer object, $z_1+r_1$; if the minimum depth of the distant object is greater than the maximum depth of the closer object, that is, if $(z_2-r_2)>(z_1+r_1)$, then the objects are spaced one from the other.

The culling process described thus far, is dependent upon the fit of the bounding sphere to the distant object, and the fit of the bounded sphere to the closer object. A better fit can be obtained, according to another aspect of the present invention, to more accurately predict when a distant object should be discarded. This reduces further the instances in which after rendering the objects in the normal manner, one finds that the distant object is completely obstructed by the closer object.

According to one aspect of the present invention, a better fit is achieved by using multiple spheres. Referring now to FIG. 9, a planar view of a 3-dimensional building 610 is illustrated. A single bounding sphere 620 is illustrated completely encircling the building 610. Note the shaded portion 625 in FIG. 9, which represents the volume contained in the sphere 620 that is not occupied by the building 610; this shaded portion 625 will be considered further below.

Also illustrated in FIG. 9 is the planar view of a 3-dimensional building 630. The buildings 610 and 630 each have the same size and shape.

The building 630 is wholly contained within two spheres 640a and 640b, when the two spheres are considered together. That is, the two spheres 640a and 640b, when considered as a single geometric object, totally contain the building 630. Note the shaded portion 645, which represents the volume contained within the 3-dimensional shape formed by the two spheres 640a and 640b, that is not occupied by the building 630. The shaded region 645 is smaller than the shaded region 625, thereby indicating that the spheres 640a and 640b more closely approximate the building 630, than does the sphere 620 approximate the building 610.

Referring now to FIGS. 9 and 10, FIG. 9 illustrates using a plurality of bounding circles 640a and 640b to better approximate the building 630, rather than using a single bounding sphere 620. FIG. 10 illustrates using a plurality of bounded spheres 740a, 740b, . . . , 740i to better approximate a 3-dimensional building 730, rather than using a single bounded sphere 720.

For a plurality of bounding spheres, as illustrated in FIG. 9, the spheres, when considered together, form a geometric volume that wholly contains the distant 3-dimensional object. For a plurality of bounded spheres, as illustrated in FIG. 10, the spheres, when considered together, are all wholly contained within the volume of the closer 3-dimensional object. The number of spheres used can be increased depending upon the closeness of fit desired. The closer the fit, the less conservative the culling, that is, the certainty increases of knowing that a particular distant object is completely obstructed by a closer object, thereby resulting in fewer distant objects being rendered and, after rendering, finding out that the object is completely obstructed from view by the closer object. The greater the number of spheres, however, the more calculations need to be made.

When the object farther from the view plane is approximated by a plurality of spheres, which together completely bound the object, as illustrated by the spheres 640a and 640b bounding the object 630 in FIG. 9, each of those spheres are projected onto the view plane. Each project into a circle, and each of those circles is compared, one at a time, to the near-object projection circle formed by projecting the largest bounded sphere of the closer object onto the view plane. If all of the far-object projection circles, for example, the two formed by the spheres 640a and 640b, are completely contained within the near-object projection circle, then the distant object is totally obstructed from view by the closer object, and the distant object is discarded. If, on the other hand, the far-object projection circle for any of the plurality of spheres is not completely contained within the near-object projection circle, then the distant object is not completely obstructed by the closer object, and therefore should not be discarded.

When the closer object is approximated by a plurality of spheres, as illustrated in FIG. 10, each of those spheres, for example, the spheres 740a, 740b, . . ., 740i, are projected onto the view plane. Each project into a circle, and each of those circles are compared, one at a time, with the far-object projection circle of the smallest bounding sphere of the distant object. If any of the near-object projection circles completely contains the far-object projection circle, then the distant object is completely obstructed from view by the closer object, and the distant object is discarded.

Although the objects illustrated in the view frustum 10 in FIG. 1, for example, the man 22 and the plants 24, are geometrically more complex than the 3-dimensional boxes 110 and 130 of FIG. 3 and the 3-dimensional buildings 610, 630, 720, and 730 of FIGS. 9 and 10, the principle is the same. The smallest bounding sphere for the man 22, and the largest bounded sphere for the plants 24 are each projected to the view plane 14, forming a far-object projection circle for the man, and a near-object projection circle for the plants. If the near-object projection circle for the plants totally contains the far-object projection circle for the man, the distant man is completely obstructed from view by the closer plants 24. If better fit is desired, the distant man 22 can be approximated by a plurality of bounding spheres, such as the spheres 640a and 640b illustrated in FIG. 9, or the plants 24 can be approximated by a plurality of bounded spheres, such as the spheres 740a, 740b, . . ., 740i illustrated in FIG. 10, or both, as described above.

The bounded and bounding spheres may be calculated before the computer game is played and stored for subsequent use, or may be calculated as the game is played, depending on the needs of the game and the desires of the game's designer. For example, for an object whose shape does not change during game play, the bounded and bounding spheres for that object may be calculated and stored before the game is played. For an object whose shape does change, and the object is composed of subobjects that individually do not change shape (for example, a person composed of a head, a torso, two arms, and two legs; sometimes called an articulated body), the bounded and bounding spheres of the subobjects can be used and those spheres calculated and stored before the game is played. For an object whose shape changes, and the object is not composed of rigid subobjects such as those of the articulated body described above, the bounded and bounding spheres may be re-computed as the shape changes during game play.

The present invention provides a very rapid way of determining, in real-time, whether a distant object should be discarded, thereby eliminating the numerous calculations needed to render objects which are obstructed from view, and speeding-up the rendering of images in real-time 3-dimensional computer graphics. While the invention has been described with respect to 3-dimensional objects, it can also be applied to 2-dimensional objects. Thus the present invention can be advantageously used with video graphics sprites and billboards, as described below.

In video graphics, at times it is desired to impose a 2-dimensional object onto the computer screen, for example, a cursor in a Windows® program, or a foreground character such as a missile in a game program; these are sometimes called sprites. At times it is desired to have a 2-dimensional object rotate about an axis so that it always turns to face the observer, for example, a tree in a driving game program might be represented by a 2-dimensional image of a tree that rotates around it's vertical axis to always face the viewer; these are sometimes called billboards. Sprites and billboards are each 2-dimensional objects. For each of these 2-dimensional objects, the smallest bounding circle is found for the distant object, and the largest bounded circle is found for the closer object, the circles projected onto the view plane, and the resulting projections compared.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for determining whether a distant 3-dimensional object is completely obstructed by a closer 3-dimensional object, when viewed from a particular view plane, comprising the steps of:

determining which of a first 3-dimensional object and a second 3-dimensional object is farther from a view plane;

for the object farther from the view plane, determining that object's smallest bounding sphere;

for the object closer to the view plane, determining that object's largest bounded sphere;

projecting the smallest bounding sphere of the farther object onto the view plane forming a far-object projection circle;

projecting the largest bounded sphere of the closer object onto the view plane forming a near-object projection circle; and determining whether the near-object projection circle completely contains the far-object projection circle.

2. The method of claim 1:

wherein the first and second objects are each located in front of the view plane, and a reference point is located behind the view plane; and wherein the steps of projecting the bounding sphere and the bounded sphere onto the view plane each include the step of projecting said sphere to the reference point.

3. A method for culling a distant 3-dimensional object when that object is completely obstructed from view by a closer 3-dimensional object, including the steps of:

determining which of a first 3-dimensional object and a second 3-dimensional object is farther from a view plane;

for the object farther from the view plane, determining that object's smallest bounding sphere;

for the object closer to the view plane, determining that object's largest bounded sphere;

projecting the smallest bounding sphere of the farther object onto the view plane forming a far-object projection circle;

projecting the largest bounded sphere of the closer object onto the view plane forming a near-object projection circle; and discarding the object farther from the view plane if the near-object projection circle completely contains the far-object projection circle.

4. The method of claim 3:

wherein the first and second objects are each located in front of the view plane, and a reference point is located behind the view plane; and wherein the steps of projecting the bounding sphere and the bounded sphere onto the view plane each include the step of projecting said sphere to the reference point.

5. A method for determining whether a distant 3-dimensional object is completely obstructed by a closer 3-dimensional object, when viewed from a particular view plane, comprising the steps of:

determining which of a first 3-dimensional object and a second 3-dimensional object is farther from a view plane;

for the object farther from the view plane, determining that object's smallest bounding sphere;

for the object closer to the view plane, determining a plurality of spheres, which together approximate the shape of the object, and which together are bounded by the object;

projecting the smallest bounding sphere of the farther object onto the view plane forming a far-object projection circle;

projecting each of said plurality of spheres onto the view plane forming a plurality of near-object projection circles; and determining whether any of the near-object projection circles completely contains the far-object projection circle.

6. The method of claim 5:

wherein the first and second objects are each located in front of the view plane, and a reference point is located behind the view plane; and wherein the steps of projecting the bounding sphere and the plurality of spheres onto the view plane each include the step of projecting said sphere to the reference point.

7. A method for determining whether a distant 3-dimensional object is completely obstructed by a closer 3-dimensional object, when viewed from a particular view plane, comprising the steps of:

determining which of a first 3-dimensional object and a second 3-dimensional object is farther from a view plane;

for the object farther from the view plane, determining a plurality of spheres, which together completely bound the object, and which together are approximately filled by the object;

for the object closer to the view plane, determining that object's largest bounded sphere;

projecting the largest bounded sphere of the closer object onto the view plane forming a near-object projection circle;

for each of said plurality of spheres, projecting the sphere onto the view plane forming a particular far-object projection circle; and determining whether all of the particular far-object projection circles are completely contained within the near-object projection circle.

8. The method of claim 7:

wherein the first and second objects are each located in front of the view plane, and a reference point is located behind the view plane; and wherein the steps of projecting the bounded sphere and the plurality of spheres onto the view plane each include the step of projecting said sphere to the reference point.

9. A method for culling a distant 3-dimensional when that object is completely obstructed from view by a closer 3-dimensional object, including the steps of:

determining which of a first 3-dimensional object and a second 3-dimensional object is farther from a view plane;

for the object farther from the view plane, determining that object's smallest bounding sphere;

for the object closer to the view plane, determining a plurality of spheres, which together approximate the shape of the object, and which together are bounded by the object;

projecting the smallest bounding sphere of the farther object onto the view plane forming a far-object projection circle;

projecting each of said plurality of spheres onto the view plane forming a plurality of near-object projection circles; and discarding the object farther from the view plane if any of the near-object projection circles completely contains the far-object projection circle.

10. The method of claim 9:

wherein the first and second objects are each located in front of the view plane, and a reference point is located behind the view plane; and wherein the steps of projecting the bounding sphere and the plurality of spheres onto the view plane each include the step of projecting said sphere to the reference point.

11. A method for culling a distant 3-dimensional object when that object is completely obstructed from view by a closer 3-dimensional object, including the steps of:

determining which of a first 3-dimensional object and a second 3-dimensional object is farther from a view plane;

for the object farther from the view plane, determining a plurality of spheres, which together completely bound the object, and which together are approximately filled by the object;

for the object closer to the view plane, determining that object's largest bounded sphere;

projecting the largest bounded sphere of the closer object onto the view plane forming a near-object projection circle;

for each of said plurality of spheres, projecting the sphere onto the view plane forming a particular far-object projection circle, and discarding the object farther from the view plane if all of the particular far-object projection circles are completely contained within the near-object projection circle.

12. The method of claim 11:

wherein the first and second objects are each located in front of the view plane, and a reference point is located behind the view plane; and wherein the steps of projecting the bounded sphere and the plurality of spheres onto the view plane each include the step of projecting said sphere to the reference point.

13. A method for determining whether a distant object is completely obstructed by a closer object, when viewed from a particular view plane, wherein each of said objects may be either a 2-dimensional object or a 3-dimensional object, and wherein a 2-dimensional circle is defined to be a circle and a 3-dimensional circle is defined to be a sphere, comprising the steps of:

determining which of a first object and a second object is farther from a view plane;

for the x-dimensional object farther from the view plane, determining that object's smallest x-dimensional bounding circle, when x-dimensional is either 2-dimensional or 3-dimensional;

for the y-dimensional object closer to the view plane, determining that object's largest y-dimensional bounded circle, when y-dimensional is either 2-dimensional or 3-dimensional;

projecting the smallest x-dimensional bounding circle of the farther object onto the view plane forming a far-object projection;

projecting the largest y-dimensional bounded circle of the closer object onto the view plane forming a near-object projection; and determining whether the near-object projection completely contains the far-object projection.

14. A method for culling an distant object when that object is completely obstructed from view by a closer object, wherein each of said objects may be either a 2-dimensional object or a 3-dimensional object, and wherein a 2-dimensional circle is defined to be a circle and a 3-dimensional circle is defined to be a sphere, including the steps of:

determining which of a first object and a second object is farther from a view plane;

for the x-dimensional object farther from the view plane, determining that object's smallest x-dimensional bounding circle, when x-dimensional is either 2-dimensional or 3-dimensional;

for the y-dimensional object closer to the view plane, determining that object's largest y-dimensional bounded circle, when y-dimensional is either 2-dimensional or 3-dimensional;

projecting the smallest x-dimensional bounding circle of the farther object onto the view plane forming a far-object projection;

projecting the largest y-dimensional bounded circle of the closer object onto the view plane forming a near-object projection; and discarding the object farther from the view plane if the near-object projection completely contains the far-object projection.

15. A method for determining whether a distant 3-dimensional object is completely obstructed by a closer 3-dimensional object, when viewed from a particular view plane, comprising the steps of:

determining which of a first 3-dimensional object and a second 3-dimensional object is farther from a view plane;

for the object farther from the view plane, determining that object's minimum depth;

for the object closer to the view plane, determining that object's maximum depth; and determining whether the minimum depth of the distant object is greater than the maximum depth of the closer object.

* * * * *